United States Patent
Lin et al.

(10) Patent No.: US 9,285,791 B2
(45) Date of Patent: Mar. 15, 2016

(54) MONITORING SYSTEM

(71) Applicant: PEGATRON CORPORATION, Taipei (TW)

(72) Inventors: Yu-Te Lin, Taipei (TW); Chih-Yung Wang, Taipei (TW); Yu-Chen Liu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 80 days.

(21) Appl. No.: 14/191,445

(22) Filed: Feb. 27, 2014

(65) Prior Publication Data

US 2014/0285349 A1    Sep. 25, 2014

(30) Foreign Application Priority Data

Mar. 22, 2013   (TW) .............................. 102110333 A

(51) Int. Cl.
| G05B 19/00 | (2006.01) |
| --- | --- |
| G06K 15/00 | (2006.01) |

(52) U.S. Cl.
CPC ................ *G05B 19/00* (2013.01); *G06K 15/00* (2013.01); *G09G 2340/0492* (2013.01)

(58) Field of Classification Search
CPC ........ B60Q 1/482; G01B 11/18; G01B 11/24; G06F 17/30017; G06F 1/1616; G06K 7/10613; G06K 7/10633; G06K 7/10702; G06Q 10/20; G06Q 20/1085; G06Q 20/123; G06Q 20/204; G06Q 30/0617; G06Q 40/00; G09G 2330/021; G09G 2360/144; G09G 3/3406; G09G 5/10; H02S 50/10; H04H 60/04; H04N 5/262; H04N 5/265; H05B 33/0854; H05B 37/0218; H05B 41/325
USPC ................... 340/679; 235/379, 381, 454, 470
See application file for complete search history.

(56) References Cited

U.S. PATENT DOCUMENTS

| 3,733,855 | A | * | 5/1973 | Bliss-Hill et al. ................ 66/219 |
| --- | --- | --- | --- | --- |
| 5,868,101 | A | * | 2/1999 | Marshall ........................ 119/428 |
| 5,897,786 | A | * | 4/1999 | Henkel et al. ................. 210/744 |
| 7,236,154 | B1 | * | 6/2007 | Kerr et al. ..................... 345/102 |
| 2002/0027776 | A1 | * | 3/2002 | Gross .............................. 362/84 |
| 2004/0222292 | A1 | * | 11/2004 | Turocy et al. ................. 235/381 |
| 2005/0071124 | A1 | * | 3/2005 | Komatsu ....................... 702/182 |
| 2005/0072194 | A1 | * | 4/2005 | Ryohke et al. ................. 68/3 R |
| 2008/0117396 | A1 | * | 5/2008 | Hori ............................... 355/53 |
| 2008/0120196 | A1 | * | 5/2008 | Reed et al. ...................... 705/26 |

(Continued)

FOREIGN PATENT DOCUMENTS

| CN | 202486830 U | 10/2012 |
| --- | --- | --- |
| TW | 586668 | 5/2004 |

(Continued)

*Primary Examiner* — Fekadeselassie Girma
(74) *Attorney, Agent, or Firm* — CKC & Partners Co., Ltd.

(57) ABSTRACT

A monitoring system can be used to monitor an operation status of at least one machine. The machine has an operation lamp. The operation lamp is used to emit light when the operation status of the machine is under operation. The monitoring system includes at least one light sensor and at least one controller. The light sensor is disposed at the operation lamp for emitting a sensing signal according to the brightness of the operation lamp of the machine. The controller is electrically connected with the light sensor for determining, the operation status of the machine according to the sensing signal.

10 Claims, 8 Drawing Sheets

(56) References Cited

U.S. PATENT DOCUMENTS

| | | | |
|---|---|---|---|
| 2008/0252599 A1* | 10/2008 | Ross et al. | 345/157 |
| 2009/0014525 A1* | 1/2009 | Gillet et al. | 235/470 |
| 2009/0284387 A1* | 11/2009 | Marchetti | G06K 15/00 340/815.45 |
| 2011/0069479 A1* | 3/2011 | Hashimoto et al. | 362/183 |
| 2012/0162650 A1* | 6/2012 | Wynn et al. | 356/432 |
| 2013/0218321 A1* | 8/2013 | Miyamoto et al. | 700/166 |
| 2013/0265772 A1* | 10/2013 | Lu et al. | 362/308 |
| 2014/0285349 A1* | 9/2014 | Lin et al. | 340/679 |
| 2014/0339303 A1* | 11/2014 | Crews et al. | 235/379 |
| 2015/0100000 A1* | 4/2015 | Asaoka | 600/587 |

FOREIGN PATENT DOCUMENTS

| | | |
|---|---|---|
| TW | M380524 | 5/2010 |
| TW | M428503 | 5/2012 |

* cited by examiner

MONITORING SYSTEM

CROSS-REFERENCE TO RELATED APPLICATIONS

This application claims priority to Taiwan Application Serial Number 102110333, filed Mar. 22, 2013, which is herein incorporated by reference.

BACKGROUND OF THE INVENTION

1. Field of Invention

The invention relates to a monitoring system and, in particular, to a monitor system for monitoring the operation status of a machine.

2. Related Art

In modem factories, CNC (computer numerical control) machines have become indispensable tools for accomplishing various machining operations such as cutting or drilling.

A factory may have tens of, or even hundreds of, CNC machines. For monitoring the operation status of each CNC machine, for example, whether the CNC machine is under operation or not, each CNC machine may be installed with a monitoring program for generating data reflecting the operation status of the machine. The CNC machine may provide the above-mentioned data to the administrator of the factory by connecting to a server via an interface.

However, the monitoring programs installed in CNC machines of different venders are different. Therefore, if machines from different venders (such as 10 different venders) are within the same factory, the manufacturer must purchase different monitoring programs (such as 10 different programs), which no doubt increases costs.

SUMMARY OF THE INVENTION

In view of the above, one objective of the invention is to provide a monitoring system that can monitor the operation statuses of different machines by light sensing. Therefore, costs are reduced significantly since it is not necessary to purchase different monitoring programs for machines from different venders.

To achieve the above objective, according to one embodiment of the invention, a monitoring system can be used to monitor an operation status of at least one machine. The machine has an operation lamp. The operation lamp is for emitting light when the operation status of the machine is under operation. The monitoring system includes at least one light sensor and at least one controller. The light sensor is disposed at the operation lamp for sending a sensing signal according to the brightness of the operation lamp of the machine. The controller is electrically connected with the light sensor for determining the operation status of the machine according to the sensing signal.

In one or more embodiment of the invention, the monitoring system may further include a fastener. The fastener is disposed at the operation lamp the light sensor is disposed at the fastener.

In one or more embodiment of the invention, the fastener includes a light-shielding body. The light-shielding body has an accommodation groove and an inner surface. The inner surface is adjacent to the operation lamp. The accommodation groove is concavely formed at the inner surface. The light sensor is accommodated in the accommodation groove.

In one or more embodiment of the invention, the monitoring system may include at least one flexible structure. The flexible structure is disposed between the fastener and the operation lamp.

In one or more embodiment of the invention, the controller includes a plurality of connecting ports. The number of the light sensor is plural. The light sensors are electrically connected with the connecting ports of the controller, respectively.

In one or more embodiment of the invention, the monitoring system may include at least one light-emitting diode. The light-emitting diode is electrically connected with the controller for emitting light when the controller determines that the operation status of the machine is under operation.

In one or more embodiment of the invention, the light sensor includes a photoresistor and a variable resistor. The photoresistor may be used for changing the resistance in view of the brightness of the operation lamp of the machine. The variable resistor is serially connected with the photoresistor.

In one or more embodiment of the invention, the monitoring system may include an amplifier. The amplifier is electrically connected between the light sensor and the controller for amplifying the sensing signal sent from the light sensor to the controller.

In one or more embodiment of the invention, the monitoring system may include a level converter. The level converter is electrically connected between the light sensor and the controller for increasing the difference between the high level and the low level of the controller.

In one or more embodiment of the invention, the controller includes a sensing signal collecting unit and a sensing signal determining unit. The sensing signal collecting unit is for collecting the sensing signals sent from the light sensor at multiple time points. The sensing signal determining unit is for determining whether the operation status of the machine is under operation according to the sensing signals collected by the sensing signal collecting unit.

In one or more embodiment of the invention, the monitoring system may include at least one relay and a server. The number of the controller is plural. The controllers are electrically connected with the relay. The server is electrically connected with the relay.

In one or more embodiment of the invention, the monitoring system may further include at least one wireless access point and a server. The number of the controller is plural. The controllers are connected with the wireless access point wirelessly. The server is electrically connected with the wireless access point, Since the operation lamp of the machine emits light when the operation status of the machine is under operation, the monitoring system can use the light sensor to sense the brightness of the operation lamp of the machine to obtain whether the operation status of the machine is under operation or not. Since it is only necessary to sense the brightness of the operation lamp of the machine, there is no need to purchase monitoring programs of different venders. Therefore, costs are reduced significantly.

The above descriptions are only for describe the problem to be solved by the invention, the technical means to solve the problem, and the result it produced. The specific details of the invention will be described in the proceeding detailed descriptions with reference to the accompanying drawings.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
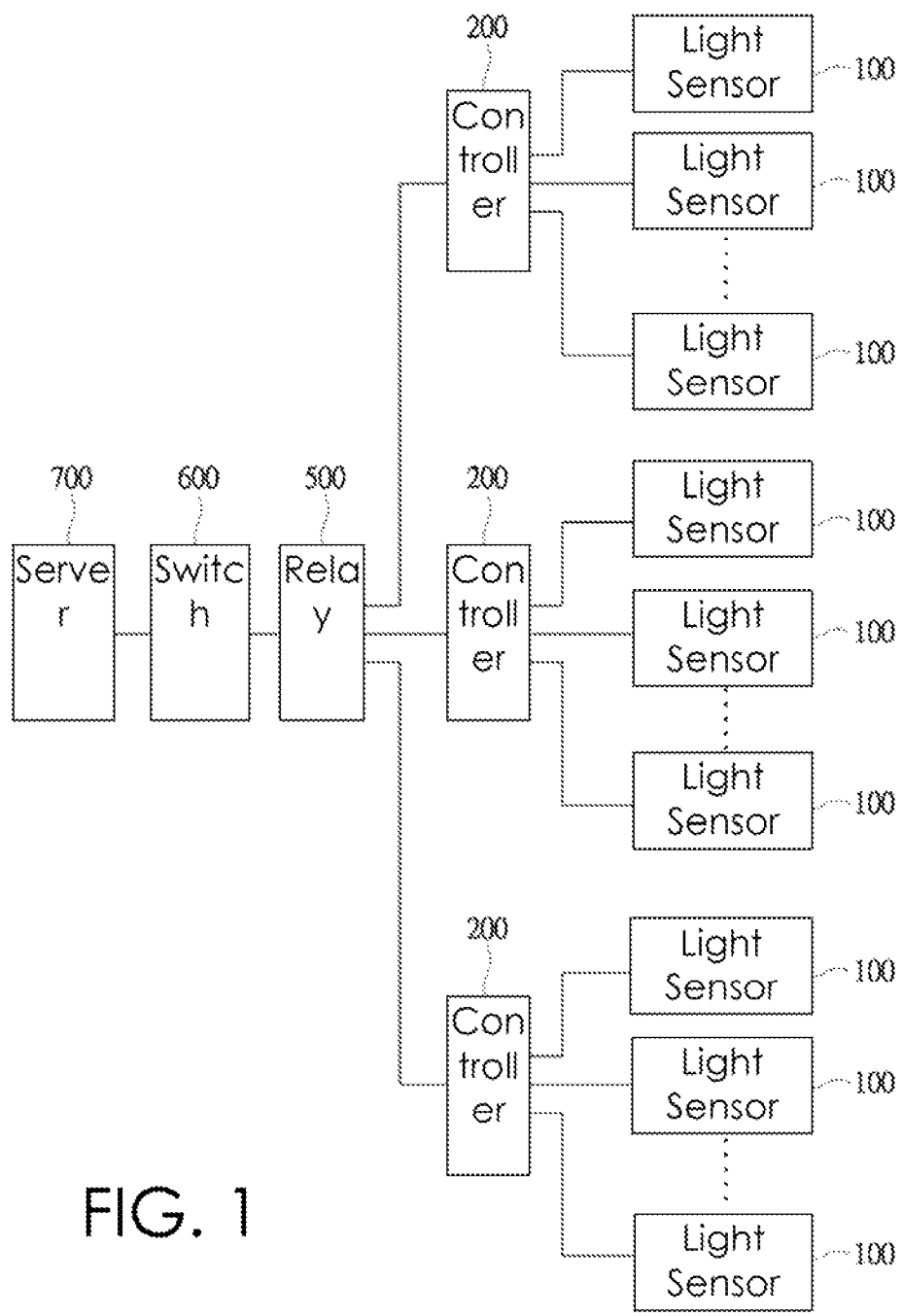
FIG. 1 is a system block diagram showing the monitoring system according to an embodiment of the invention.

FIG. 1 is a system block diagram showing the monitoring system according to an embodiment of the invention. As shown in FIG. 1, the monitoring system according to the embodiment may include at least one light sensor 100, at least one controller 200, at least one relay (such as NPort®) 500, a switch 600 and a server 700. The light sensors 100 may be electrically connected to the same controller 200, and transmit the sensing signals generated respectively to the controller 200. The controllers 200 may be electrically connected to the relay 500. The relay 500 may be electrically connected to the server 700 via the switch 600. With this arrangement, an administrator can obtain the sensing signal of the light sensors 100 and the determination results of the controllers 200 via the server 700 to know the operation status of each machine.

Figure 2:
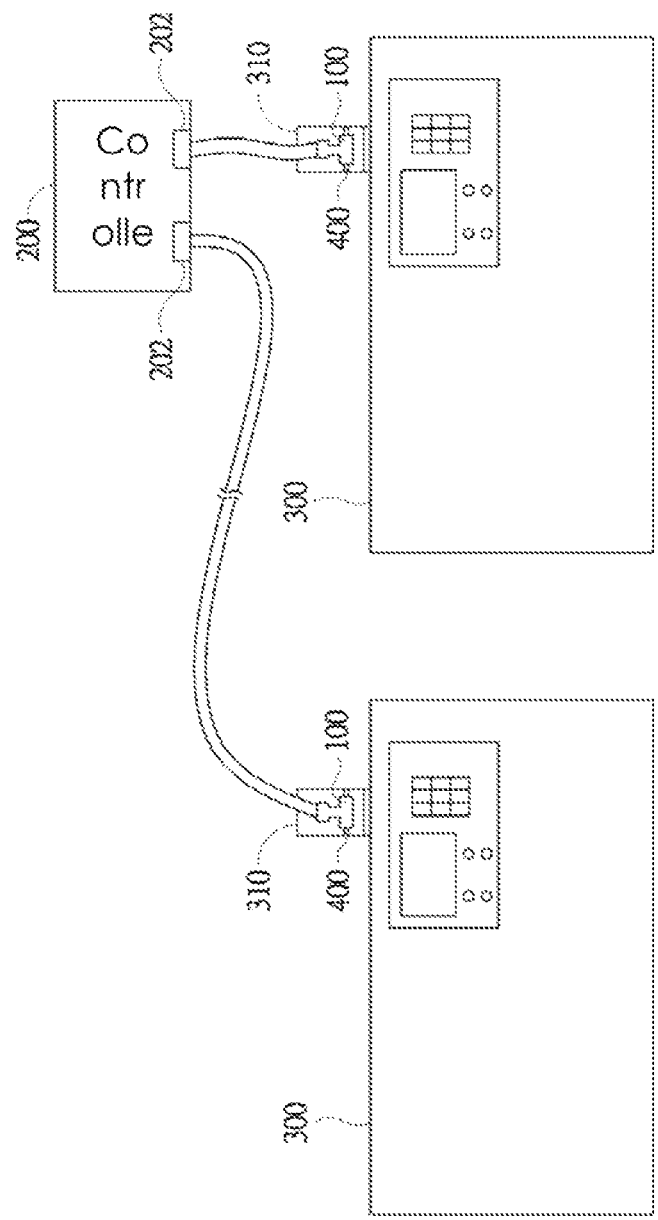
FIG. 2 is an architecture diagram of the monitoring system according to an embodiment of the invention.

FIG. 2 is an architecture diagram of the monitoring system according to an embodiment of the invention. As shown in FIG. 2, each machine 300 has an operation lamp 310. The operation lamp 310 is for emitting, light when the machine 300 is under an operation status. Specifically speaking, when the operation status of the machine 300 is under operation, the operation lamp emits light, and when the operation status of the machine 300 is not under operation, the operation lamp 310 does not emit light. That is, the emission of light of the operation lamp 310 is synchronized with the operation of the machine 300. The light sensor 100 is disposed at the operation lamp 310. The light sensor 100 sends the sensing signal according to the brightness of the operation lamp 310 of the machine 300. That is, the light sensor 100 sends the sensing signal when the operation lamp 310 of the machine 300 emits light due to the operation of the machine 300. The controller 200 is electrically connected to the light sensor 100 for determining the operation status of the machine 300 based on the sensing signal sent form the light sensor 100.

The emission of light of the operation lamp 310 is synchronized with the operation of the machine 300 to avoid industrial safety issues. Based on such characteristic, the monitoring system may use the light sensor 100 to sense the brightness of the operation lamp 310 of the machine 300 to obtain whether the operation status of the machine 300 is under operation or not under operation. Since it is only necessary for the embodiment to sense the brightness of the operation lamp 310 of the machine 300, there is no need to purchase monitoring programs from the venders of the machines 300 respectively. Therefore, costs are reduced significantly.

In some embodiments, as shown in FIG. 2, the controller 200 may include a plurality of connecting ports 202. The light sensors 100 may be electrically connected to the connecting ports 202 of the controller 200 respectively, and send sensing signals to the controller 200 respectively, for the controller 200 to determine the operation status of each machine 300. In other works, in the embodiment of the invention, one controller 200 may monitor multiple machines 300 via multiple light sensors 100. Therefore, the problem that in a conventional monitoring system one controller can only monitor one machine 300 due to the compatibility of the monitoring program can be overcome. In some embodiment, the machines 300 may be CNC machines, but the invention is not limited therein.

In some embodiments, as shown in FIG. 2, the monitoring system may selectively include at least one fastener 400 The fastener 400 is disposed at the operation lamp 310, and the light sensor 100 is disposed at the fastener 400. As a result, sine the light sensor 100 is fastened on the operation lamp 310 via the fastener 400, it will not be detached from the operation lamp 310. In some embodiments, the fastener 400 may have a ring-shaped structure so that the fastener 400 can be disposed tightly around the operation lamp 310 tightly to help fasten the light sensor 100. In some embodiments, the operation lamp 310 has columnar body so that the fastener 400 can be disposed tightly thereon. For example, the shape of the operation lamp 310 may be a cylinder, an oval cylinder or a prism, and the structure of the fastener 400 may vary in view of the shape of the operation lamp 310, the invention is not limited therein.

Figure 3:
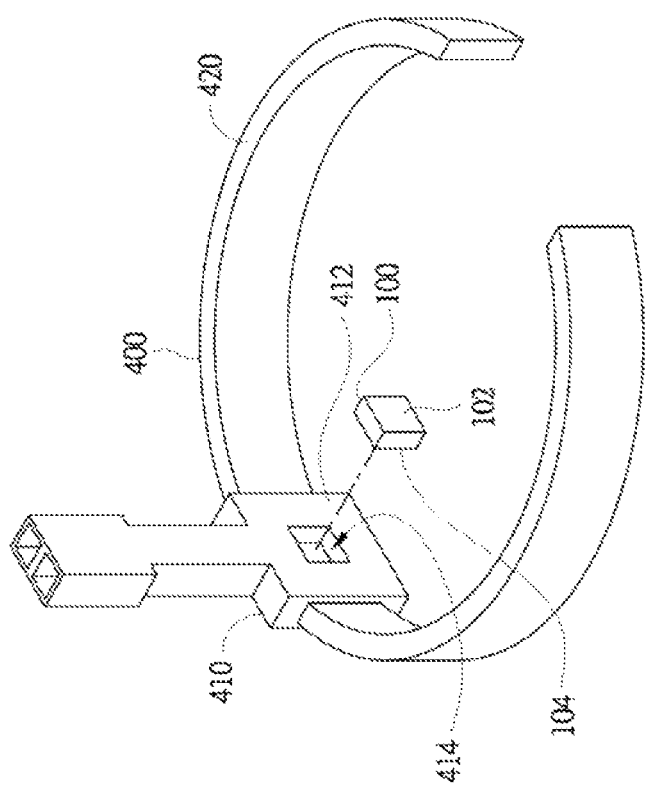
FIG. 3 is an exploded perspective diagram of the fastener and the light sensor according to one embodiment of the invention.

FIG. 3 is an exploded perspective diagram of the fastener 400 and the light sensor 100 according to one embodiment of the invention. As shown in FIG. 3, the fastener 400 includes a light-shielding body 410 and a ring-shaped portion 420. The ring-shaped portion 420 may be used to be disposed tightly around the operation lamp 310 (please refer in FIG. 2). The light-shielding body 410 is disposed at a portion of the ring-shaped portion 420. The light-shielding body 410 has an inner surface 412 and an accommodation groove 414. The inner surface 412 of the light-shielding body 410 is adjacent to the operation lamp 310 (please refer to FIG. 2). That is, when the fastener 400 is disposed around the operation lamp 310, the inner surface 412 of the fastener 400 is shielded and is not exposed to the outside. The accommodation groove 414 is concavely formed at the inner surface 412 of the light-shielding body 401. The light sensor 100 may be accommodated in the accommodation groove 414.

Since the inner surface 412 of the fastener 400 is not exposed to the outside when the fastener 400 is disposed around the operation lamp 310, the accommodation groove 414 and the light sensor 100 accommodated therein are not exposed to the outside, either. Therefore, the environmental light outside the light-shielding body 410 can be shielded by the light-shielding body 410, so that the light sensor 100 is capable of receiving the light emitted by the operation lamp 310 only (please refer to FIG. 2) and is not affected by the environmental light. In some embodiments, the shape and size of the light sensor 100 conform to those of the accommodation groove 414, so that the light sensor can be fitted in the accommodation groove 414.

In some embodiments, the light sensor 100 has a first surface 102 and a second surface 104 opposite to the first surface 102. When the fastener 400 is disposed around the operation lamp 310 (please refer to FIG. 2), the first surface 102 may be adjacent to the operation lamp 310 to receive the light from the operation lamp 310. The second surface 104 opposite to the first surface may be embedded into the accommodation groove 414 of the light-shielding body 410 so that it is not affected by the environmental light.

Figure 4:
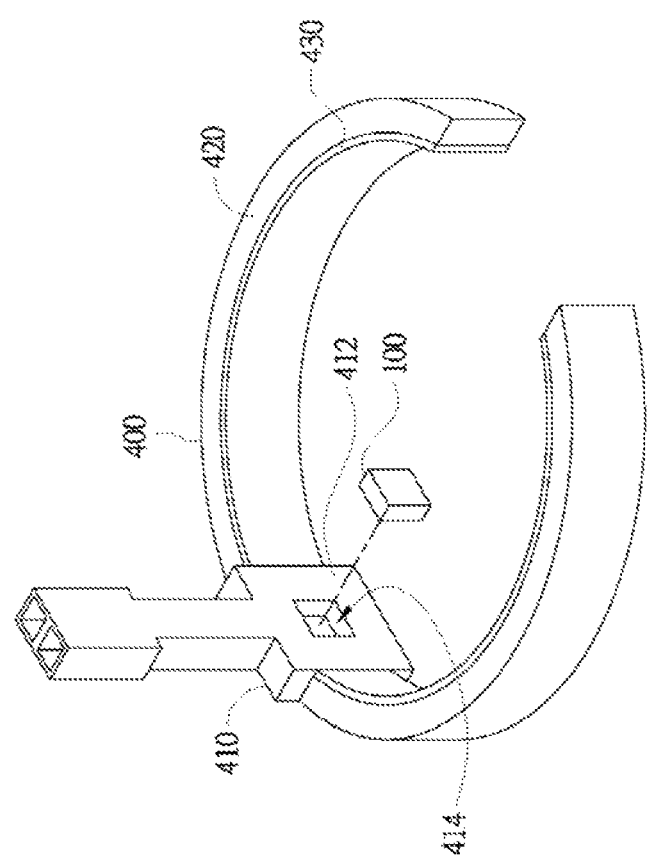
FIG. 4 is an exploded perspective diagram showing the fastener and the light sensor according to another embodiment of the invention.

FIG. 4 is an exploded perspective diagram showing the fastener 400 and the light sensor 100 according to another embodiment of the invention. The difference between the present embodiment and those shown in FIG. 3 is that the present embodiment further includes a flexible structure 430. The flexible structure 430 is disposed between the fastener 400 and the operation lamp 310 (please refer to FIG. 2). Specifically speaking, the flexible structure 430 is positioned at the inner side of the ring-shaped portion 420. When the ring-shaped portion 420 is disposed tightly around the operation lamp 310 (please refer to FIG. 2), the flexible structure 430 is sandwiched between the ring-shaped portion 420 and the operation lamp 310 to provide a buffer using its flexible characteristic and help the ring-shaped portion 420 to be disposed tightly around the operation lamp 310, In some embodiments, the shape and size of the flexible structure 430 are the same to those of the ring-shaped portion 420.

Figure 5:
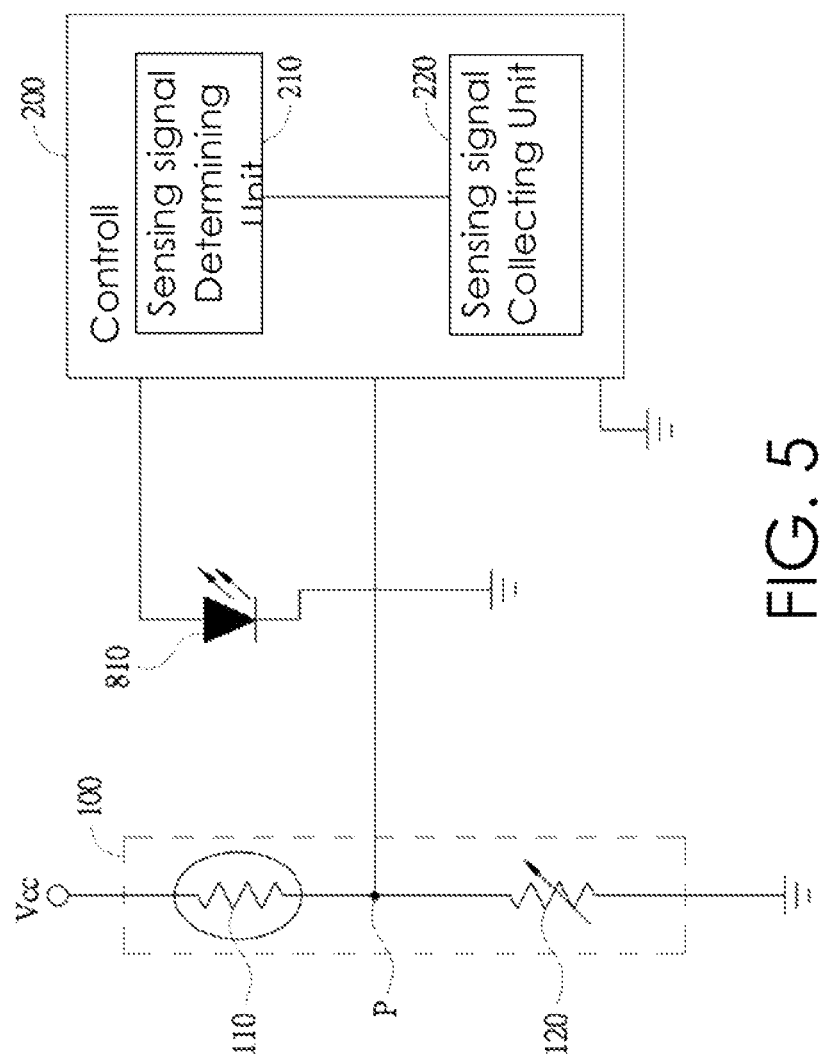
FIG. 5 is a circuit diagram between the light sensor and the controller according to an embodiment of the invention.

FIG. 5 is a circuit diagram between the light sensor 100 and the controller 200 according to an embodiment of the invention. As shown in FIG. 5, the controller 200 is electrically connected with the node P of the circuit of the light sensor 100. Therefore the voltage of the node P can be output to the controller 200 as the sensing signal. The light sensor 100 may include a photoresistor 110. The resistance of the photoresistor 110 may be changed according to the brightness of the operation lamp 310 of the machine 300. Specifically speaking, the resistance of the photoresistor 110 is related to the brightness of the received light. Therefore, the voltage of the node P changes along with the change of the brightness of the operation lamp 310, and the controller 200 can determine the operation status of the machine 300 according to the voltage of the node P received (please refer to FIG. 2). In other embodiments, the light sensor 100 may be other light-sensitive device other than the photoresistor 110, such as a photo-interrupter. The inventor is not limited therein.

In some embodiments, as shown in FIG. 5, the controller may include a sensing signal determining, unit 210. The sensing, signal determining unit 210 may be used to determine whether the operation status of the machine 300 (please refer to FIG. 2) is under operation when the sensing signal (that is, the voltage of the node P) is of a high level. Specifically speaking, when the voltage of the node P conforms to the high level of the controller 200, the sensing signal determining unit 210 can determine that the machine 300 is wider operation.

Practically, even when the machine 300 is under operation, the brightness of the operation lamp 310 may be reduced due to long-time operation, which results in that the voltage of the node P does not reach the high level of the controller 200 and thus the controller 200 cannot determine whether the machine 300 is under operation correctly. In view of this, in some embodiments, as shown in FIG. 5, the light sensor 100 may selectively include a variable resistor 120. The variable resistor 120 may be serially connected at the photoresistor 110. As a result, the user may change the ratio of the resistance between the variable resistor 120 and the photoresistor 110 by adjusting the resistance of the variable resistor 120 to adjust the voltage of the node P to facilitate the determination of the controller 200. For example, the user can increase the resistance of the variable resistor 120 to raise the voltage of the node P. In this way even when the brightness of the operation lamp 310 is reduced, the voltage of the node P may still reach the high level of the controller 200 to assist the controller 200 to determine the operation status of the machine 300 correctly.

In some embodiments, as shown in FIG. 5, the monitoring system may selectively include at least one light-emitting diode 810. The light-emitting diode 810 is electrically connected with the controller. The light-emitting diode 810 is used to emit light when the controller determines that the operation status of the machine 300 is under operation. That is, the light-emitting diode 810 emits light as long as the controller 200 determines that the operation status of the machine 300 is under operation. To the contrary, the light-emitting diode 810 does not emit light as long as the controller 200 determines that the operation status of the machine 300 is not under operation. Therefore, when the user observes that the operation lamp 310 emits light but the light-emitting diode does not emit light, the user can understand that the brightness of the operation lamp 310 may be insufficient, which causes the voltage of the node P to be insufficient to reach the high level of the controller 200 and thus the false determination of the controller 200. Afterward, the user can adjust the resistance of the variable resistor 120 so that the light emitting diode 810 and the operation lamp 310 emit light simultaneously to ensure that the determination of the controller 200 is correct.

In some embodiments, as shown in FIG. 5, the controller 200 may further include a sensing signal collecting unit 220. The sensing signal collecting unit 220 is electrically connected with the sensing signal determining unit 210. The sensing signal collecting unit 220 may collect multiple sensing signals sent from the light sensor 100 at multiple time points within a period, of time. As long as one sensing signal is of a high level, it informs the sensing signal determining unit 210 to determine that the operation status of the machine 300 is under operation.

For example, if the sensing signal sent from the light sensor 100 at 7:00 is of a high level, the sensing signal sent at 7:01 is of a low level, the sensing signal sent at 7:02 is of a low level, and the sensing signal sent at 7:03 is of a high level, since at least one of the sensing signal between 7:00 and 7:03 is of a high level, the sensing signal determining unit 210 can determine that the operation status of the machine 300 (please refer to FIG: 2) between 7:00 and 7:03 is under operation.

As a result, the monitoring system mentioned above can be used effectively with a machine 300 having a blinking operation lamp 310. Specifically, in some embodiments, When the machine 300 is under operation, the operation lamp 310 does not emit light constantly but is blinking. Although the light sensor 100 cannot provide sensing, signals of a high level at certain time points, since the sensing signal collecting unit 220 can collect the sensing signals sent from the light sensor 100 at multiple time points, it can inform the sensing signal determining unit 210 to determine that the operation status of the machine 300 is under operation as long as at least one sensing signal is of a high level. In this way, possible false determinations caused by the blinking lamp can be avoided.

Figure 6:
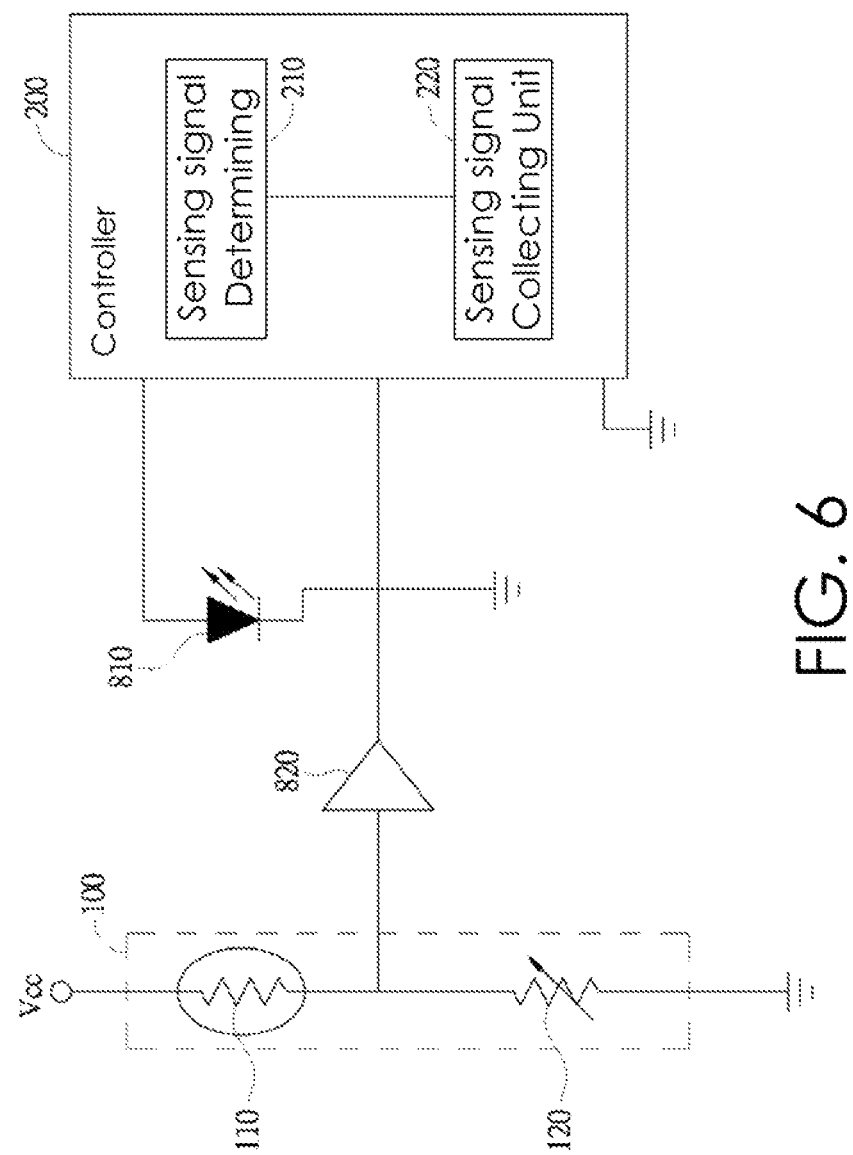
FIG. 6 is a circuit diagram between the light sensor and the controller according to still another embodiment of the invention.

FIG. 6 is a circuit diagram between the light sensor 100 and the controller 200 according to still another embodiment of the invention. The main difference between the present embodiment and that shown in FIG. 5 is that the present embodiment may selectively include an amplifier 820. The amplifier 820 is electrically connected between the light sensor 100 and the controller 200. The amplifier 820 is used to amplify the sensing signal sent from the light sensor 100 to the controller 200. In this way, the amplifier 820 can prevent the signal attenuation issue caused by the long distance between the light sensor 100 and the controller 200. In other words, the amplifier 820 is helpful for extending the distance between the light sensor 100 and the controller 200.

Figure 7:
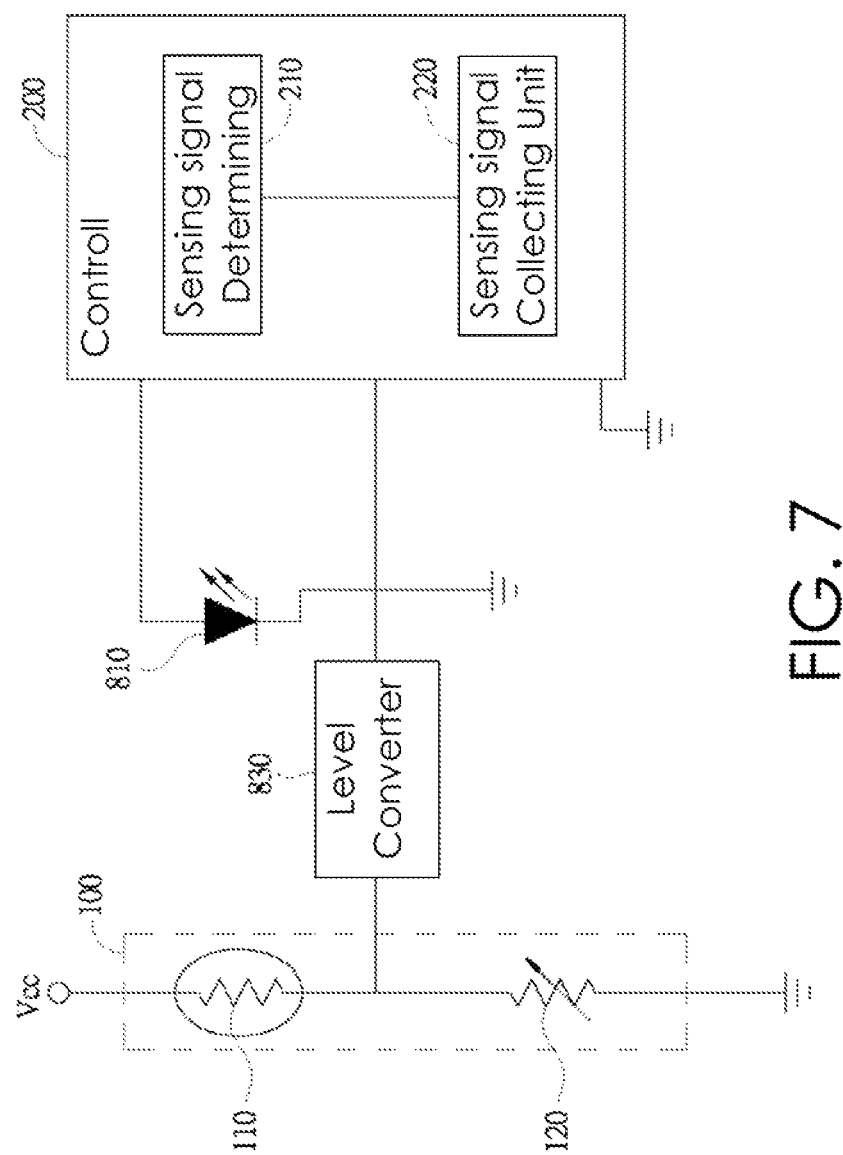
FIG. 7 is a circuit diagram between the light sensor and the controller according to still another embodiment of the invention.

FIG. 7 is a circuit diagram between the light sensor 100 and the controller 200 according to still another embodiment of the invention. The main difference between the present embodiment and that shown in FIG. 5 is that the present embodiment may further include a level converter 830. The level converter 830 is electrically connected between the light sensor 100 and the controller 200. The level converter 830 is used to increase the difference between the high level and the low level of the controller 200. Since the level converter 830 can increase the difference between the high level and the low level of the controller 200, the controller 200 is less sensitive regarding the determination of the sensing signal. Therefore, even when the signals are attenuated between the light sensor 100 and the controller 200 due to long distance, the controller does not make false determination. Therefore, the level converter 830 is helpful for extending the distance between the light sensor 100 and the controller 200.

Figure 8:
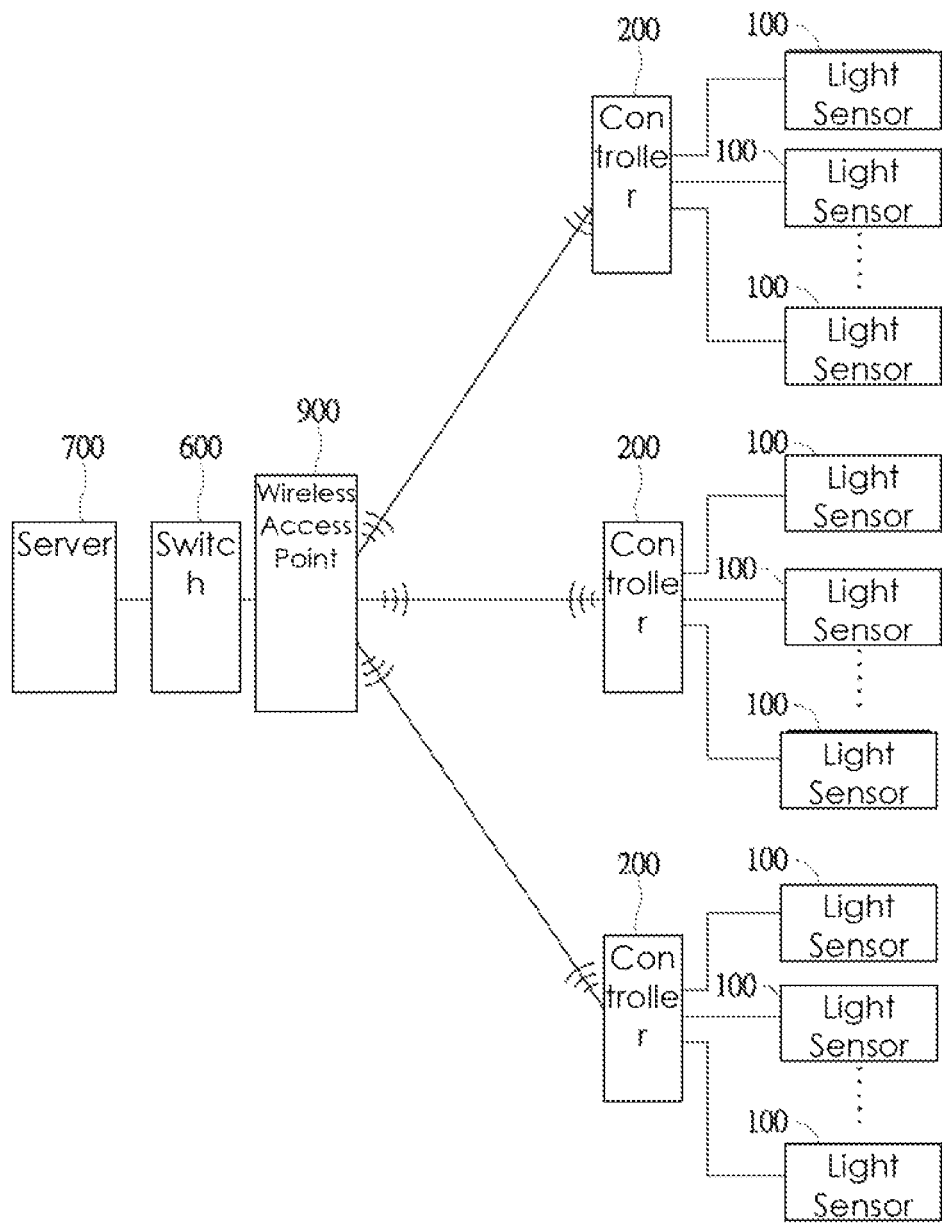
FIG. 8 is a system block diagram of the monitoring system according to another embodiment of the invention.

FIG. 8 is a system block diagram of the monitoring system according to another embodiment of the invention. The main difference between the present embodiment and that shown in FIG. 1 is that in the present embodiment a wireless access point 900 is used to replace the relay 500 in FIG. 1. Specifically speaking, the controller 200 can wirelessly connect to the wireless access point 900. The wireless access point 900 can electrically connect to the server 700 via the switch 600. The transmission specification of the wireless access point 900 may be Wi-Fi, Zigbee, or other RF signal transmission specification. The invention is not limited therein.

To sum up, the monitoring system according to the above embodiments use the light sensor 100 to sense the brightness of the operation lamp 310 of the machine 300 to obtain whether the operation status of the machine 300 is under operation or not under operation. Since it is only necessary to sense the brightness of the operation lamp 310 of the machine 300, it is not necessary to purchase monitoring programs of different venders of different machines 300. Therefore, costs are reduced significantly.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A monitoring system for monitoring an operation status of at least one machine, wherein each of the at least one machine has an operation lamp, the operation lamp is for emitting light when the operation status of the machine is under operation, the monitoring system comprising:
   at least one light sensor disposed at the operation lamp for sending a sensing signal according to brightness of the operation lamp of the machine;
   at least one fastener disposed at the operation lamp, the light sensor being disposed at the fastener, wherein the fastener includes a light-shielding body, the light-shielding body has an accommodation groove and an inner surface, the inner surface is adjacent to the operation lamp, the accommodation groove is concavely formed at the inner surface, and the light sensor is accommodated in the accommodation groove; and
   at least one controller electrically connected with the light sensor for determining the operation status of the machine according to the sensing signal.

2. The monitoring system according to claim 1, further comprising:
   at least one flexible structure disposed between the fastener and the operation lamp.

3. The monitoring system according to claim 1, wherein the controller comprises:
   a plurality of connecting ports, and the number of the at least one light sensor is plural, the light sensors are electrically connected with the connecting ports of the controller, respectively.

4. The monitoring system according to claim 1, further comprising:
   at least one light-emitting diode electrically connected with the controller for emitting light When the controller determines that the operation status of the machine is under operation.

5. The monitoring system according to claim 1, wherein the light sensor comprises:
   a photoresistor for changing resistance in view of the brightness of the operation lamp of the machine; and
   a variable resistor serially connected with the photoresistor.

6. The monitoring system according to claim 1, further comprising:
   an amplifier electrically connected between the light sensor and the controller for amplifying the sensing signal sent from the light sensor to the controller.

7. The monitoring system according to claim 1, further comprising:
   a level converter electrically connected between the light sensor and the controller for increasing difference between high level and low level of the controller.

8. The monitoring system according to claim 1, wherein the controller comprises:
   a sensing signal collecting unit for collecting the sensing signals sent from the light sensor at multiple time points; and
   a sensing signal determining unit for determining whether the operation status of the machine is under operation according to the sensing signals collected by the sensing signal collecting unit.

9. The monitoring system according to claim 1, further comprising:
   at least one relay, wherein the number of the controller is plural, the controllers are electrically connected with the relay; and
   a server electrically connected with the relay.

10. The monitoring system according to claim 1, further comprising:
   at least one wireless access point, wherein the number of the controller is plural, the controllers are connected with the wireless access point wirelessly; and
   a server electrically connected with the wireless access point.

* * * * *